(12) United States Patent
Croxford et al.

(10) Patent No.: US 10,853,694 B2
(45) Date of Patent: Dec. 1, 2020

(54) PROCESSING INPUT DATA IN A CONVOLUTIONAL NEURAL NETWORK

(71) Applicants: Apical Ltd, Cambridge (GB); Arm Limited, Cambridge (GB)

(72) Inventors: Daren Croxford, Swaffham Prior (GB); Sharjeel Saeed, Cambridge (GB); Sean Tristram LeGuay Ellis, Farnham (GB)

(73) Assignees: Apical Ltd., Cambridge (GB); ARM Ltd., Cambridge (GB)

( * ) Notice: Subject to any disclaimer, the term of this patent is extended or adjusted under 35 U.S.C. 154(b) by 100 days.

(21) Appl. No.: 16/209,505

(22) Filed: Dec. 4, 2018

(65) Prior Publication Data

US 2020/0175338 A1    Jun. 4, 2020

(51) Int. Cl.
  *G06K 9/36*    (2006.01)
  *G06K 9/62*    (2006.01)
  *G06N 3/08*    (2006.01)
  *G06N 3/04*    (2006.01)

(52) U.S. Cl.
  CPC .......... *G06K 9/6262* (2013.01); *G06K 9/36* (2013.01); *G06N 3/04* (2013.01); *G06N 3/08* (2013.01)

(58) Field of Classification Search
  CPC .............. G06K 9/6215; G05B 23/0243; G05B 23/0254; G05B 23/0283; G08B 13/19613; G08B 13/19602; G08B 13/19608; G08B 13/19656; G08B 25/00; G01N 2800/52; G06F 16/583; G06F 16/5838; G06F 16/5854; G06F 16/5862; G06F 16/5866
  See application file for complete search history.

(56) References Cited

U.S. PATENT DOCUMENTS

| | | | |
|---|---|---|---|
| 2013/0024414 A1* | 1/2013 | Herzog | G05B 23/0243 706/52 |
| 2019/0188537 A1* | 6/2019 | Dutta | G06K 9/6267 |
| 2019/0266485 A1* | 8/2019 | Singh | G06F 17/11 |

* cited by examiner

*Primary Examiner* — Quan M Hua
(74) *Attorney, Agent, or Firm* — EIP US LLP

(57) ABSTRACT

A method of processing input data using a computing system. The method comprises obtaining association data which relates a kernel in a convolutional neural network to one or more known data patterns; conducting analysis of input data for the convolutional neural network to identify whether a region of input data corresponds to at least one of the one or more known data patterns; and determining whether to process the region of input data with the kernel in the convolutional neural network based on the analysis and the association data.

18 Claims, 9 Drawing Sheets

US 10,853,694 B2

PROCESSING INPUT DATA IN A CONVOLUTIONAL NEURAL NETWORK

BACKGROUND OF THE INVENTION

Technical Field

The present invention relates to methods and apparatus for processing input data in a convolutional neural network.

Background

Methods to process input data, for example to perform feature detection operations such as object detection or object recognition, may be computationally intensive. It is desirable to reduce the processing demands of such methods.

SUMMARY

According to a first aspect of the present disclosure, there is provided a computer-implemented method of processing input data, the method comprising obtaining association data which relates a kernel in a convolutional neural network to one or more known data patterns; conducting analysis of input data for the convolutional neural network to identify whether a region of input data corresponds to at least one of the one or more known data patterns; and determining whether to process the region of input data with the kernel in the convolutional neural network based on the analysis and the association data.

According to a second aspect of the present disclosure, there is provided a system for processing input data, the system comprising processing circuitry for a convolutional neural network, wherein the processing circuitry is configured to obtain association data which relates a kernel in a convolutional neural network to one or more known data patterns; conduct analysis of input data for the convolutional neural network to identify whether a region of input data corresponds to at least one of the one or more known data patterns; and determine whether to process the region of input data with the kernel in the convolutional neural network based on the analysis and the association data.

According to a third aspect of the present disclosure, there is provided a computer program product comprising instructions which, when executed by a computing device, cause the computing device to obtain association data which relates a kernel in a convolutional neural network to one or more known data patterns; conduct analysis of input data for the convolutional neural network to identify whether a region of input data corresponds to at least one of the one or more known data patterns; and determine whether to process the region of input data with the kernel in the convolutional neural network based on the analysis and the association data.

According to a fourth aspect of the present disclosure, there is provided a computer-implemented method of pre-processing a data pattern, the method comprising pre-processing a data pattern with a kernel in a convolutional neural network to determine a data-pattern output of the kernel; and generating association data which relates the kernel in the convolutional neural network to the data pattern.

Further features and advantages of the present disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Methods described herein relate to processing input data using a computing system. The input data is processed using the computing system to detect at least one class of object in the input data. The method involves processing the input data using a neural network configured to detect a particular class of objects. The neural network allows objects belonging to a particular class of objects to be detected in the input data.

In one example, input data processed by the neural network may be image data corresponding to an image frame. Multiple frames of image data make up video data that comprises a video. Regions of image data may contain the same or similar values within said region. As an illustrative example, image data may be obtained from a security camera at a fixed position that captures a scene. Part of the scene may be, for example, a blue painted wall. As such, the region of image data from the security camera, that corresponds to the blue painted wall, may contain the same or similar values i.e. blue pixel values.

Processing image data, for example to perform a feature detection operation such as object detection or objection recognition, typically requires a significant amount of computation. However, some of this processing may be redundant if a region of the input data contains the same or similar values.

Figure 1:
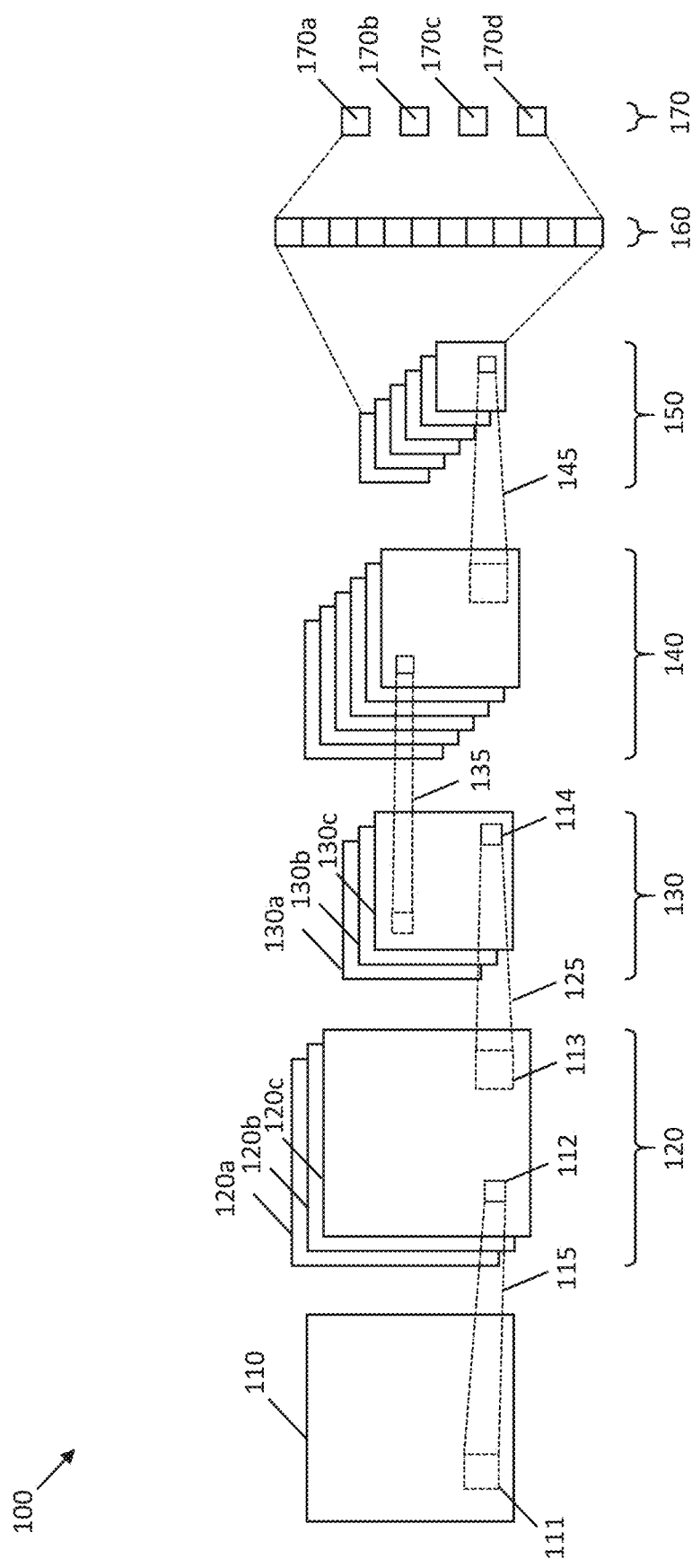
FIG. 1 is a schematic representation of a convolutional neural network.

FIG. 1 is a schematic representation of a convolutional neural network (CNN) 100. The CNN 100 includes a number of different layers 110, 120, 130, 140, 150, 160, 170. The CNN may include an input layer 110, a plurality of convolutional layers 120, 140, a plurality of pooling layers 130, 150, a plurality of fully connected layers 160 and an output layer 170. In this example, the input layer 110 corresponds to input data 110 to the CNN. In some examples, the input data may be image data 110.

The input data 110 is for example 224 pixels wide and 224 pixels high and includes 3 color channels (such as a red, green and blue color channel). The input data 110 may undergo convolutional by the convolutional layer 120. The convolutional layer (further described in relation to FIG. 2) typically extracts particular features from the input data to create activation maps or feature maps 120a, 120b, 120c. A region 111 of the input data 110 is shown schematically undergoing convolution 115 to create an output 112. Convolutional layers typically contain filters or kernels that are used to extract the particular features from the input data 110. Each kernel of the convolutional layer 120 will produce a corresponding feature map 120a, 120b, 120c. The feature maps 120a, 120b, 120c of the convolutional layer 120 may then undergo pooling 125 before they are input into a second convolutional layer 140. Pooling for example allows values for a region of an image or a feature map to be aggregated or combined. A region 113 of the feature map 120c is pooled 125 to create a pooled output 114.

In some examples, a max pooling procedure can be used. In such a scenario, the highest value in a, say, 2×2 region 113 of each feature map e.g. 120c may be determined. The highest value can then be used as an input to the second convolutional layer 140. As such, the 2×2 region 113 is now reduced to a 1×1 region 114.

Other such pooling procedures may be used, such as average pooling or L2-norm pooling. Regardless of the pooling procedure used, pooling typically reduces the amount of computation for subsequent layers of the CNN. This is shown schematically in FIG. 1 as a reduction in size of the feature maps 120a, 120b, 120c of the convolutional layer 120 compared to the pooled feature maps 130a, 130b, 130c of the pooling layer 130.

After the input data 110 has been processed by the convolutional layer 120 and the pooling layer 130, processing by a second convolutional layer 140 and second pooling layer 150 may be performed. The feature maps 130a, 130b, 130c may be processed by further convolutional 135 by the convolutional layer 140 and pooled 145 by the pooling layer 150.

While only two convolutional layers 120, 140 and two pooling layers 130, 150 are shown in FIG. 1 for simplification, it is to be appreciated that CNNs may have a greater number of layers and be significantly more complex.

After the convolutional and pooling layers 120-150, a fully connected layer 160 uses the feature maps of the last layer (in this example pooling layer 150) for classification. The fully connected layer 160 has connections to all the feature maps from the previous layer. This differs from the convolutional layers 120, 140 that may only have connections to local regions of the previous layer. The feature maps from the convolutional and pooling layers 120-150 represent high-level features of the input image 110. The fully connected layer 160 uses the features to classify the input image 110 into various outputs 170a, 170b, 170c, 170d. The output layer 170 may use a soft-max activation function that provides a probability for each possible output that sums to one.

In general, neural networks such as the CNN of FIG. 1 may undergo what is referred to as a training phase, in which the neural network is trained for a particular purpose. In an illustrative example, the CNN of FIG. 1 may be used to identify animals from static photographic images. Given input data 110 of a static photographic image of an animal, the CNN can be used to classify the animal into one of four categories e.g. elephant 170a, tiger 170b, swan 170c or horse 170d. After processing the image with the CNN, the output probability for each category may be as follows: elephant 0.01, tiger 0.94, swan 0.04, horse 0.01. As such, the image of the animal is categorized as a static photographic image of a tiger.

A neural network typically includes a number of interconnected nodes, which may be referred to as artificial neurons, or neurons. The internal state of a neuron (sometimes referred to as the activation) typically depends on an input received by the neuron, kernel weights and a bias. The output of the neuron then depends on the input, the kernel weights, the bias and the activation. The output of some neurons is connected to the input of other neurons, forming a directed, weighted graph in which edges (corresponding to neurons) or vertices (corresponding to connections) of the graph are associated with weights, respectively. The weights and biases may be adjusted throughout the training phase of the neural network, altering the output of individual neurons and hence of the neural network as a whole.

Figure 2:
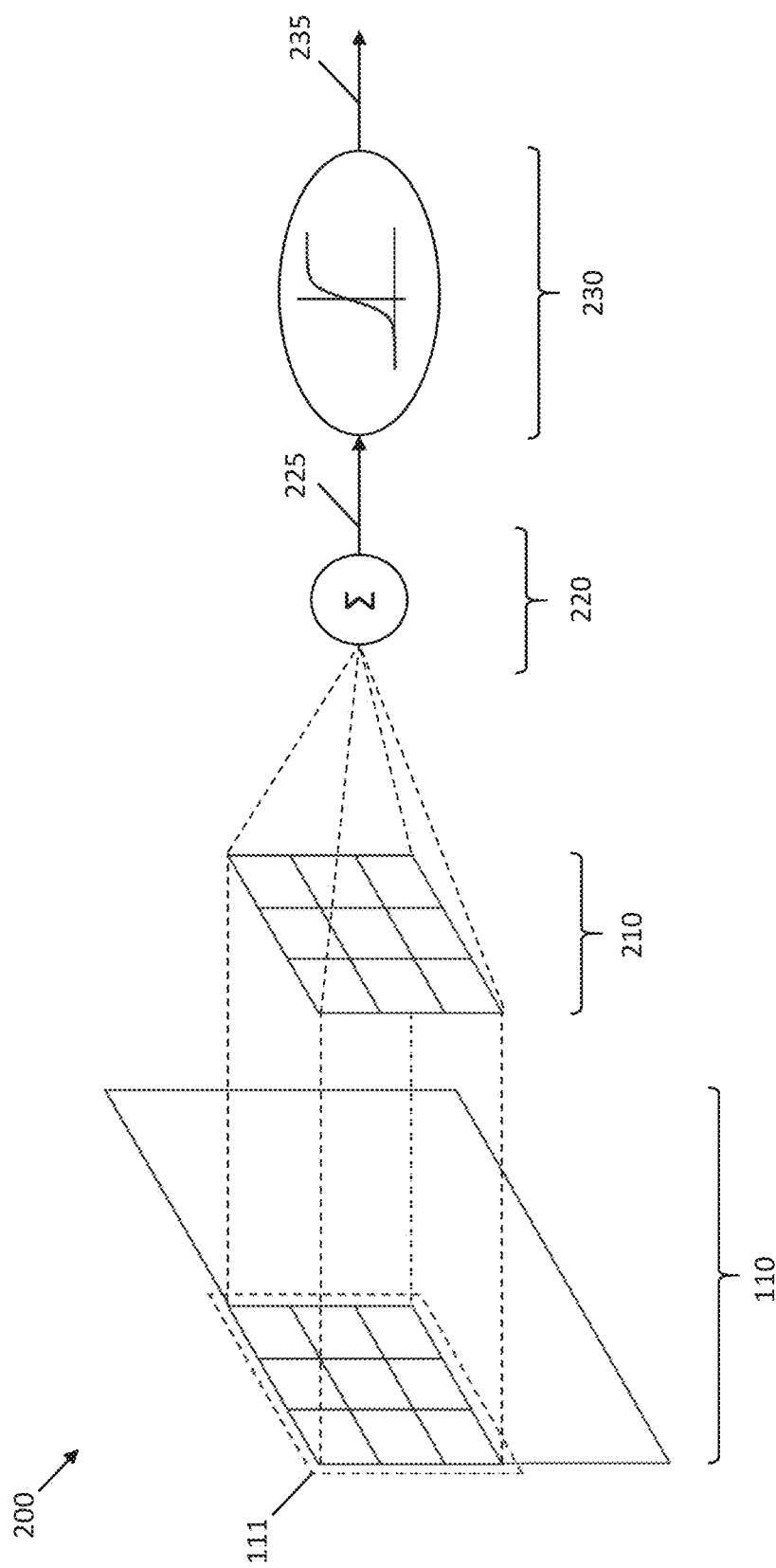
FIG. 2 is a schematic representation of the function of a neuron in a convolutional neural network.

FIG. 2 is a schematic representation 200 of elements of a neuron in a CNN. Multiple neurons may make up a convolutional layer 120, 140 in a CNN 100. A neuron may comprise of a filter or kernel 210, a multiply-and-accumulate (MAC) function 220 and an activation function 230. The input to a neuron may be input data 110 from the input layer, a region 111 of the input data 110, a feature map e.g. 120a-c from a previous convolutional layer or a pooled feature map 130a-c from a previous pooling layer 130.

The kernels allow features of the input data 110 to be identified. For example, some of the kernels may be used to identify edges in an image represented by the input data and others may be used to identify horizontal or vertical features in the image (although this is not limiting, and other kernels are possible). The precise features that the kernels identify will depend on the object that the CNN 100 is trained to identify. The kernel 210 of FIG. 2 is for example a 3×3×1 matrix, which may be convolved with the region 111 of the input data 110 with a stride of 1. Convolution of the image region 111 with the kernel 210 allows the kernel to identify features the kernel is designed to detect.

A kernel may be a three-dimensional matrix, for example, with dimensions of 3×3×n. The value of n will be the number of channels of the input data processed with the kernel in a convolutional layer of the CNN. For a kernel in the first convolutional layer, the input data is from the input layer. If, for example, the input data is image data with three color channels (i.e. red, green, blue), the value of n will be 3. For a kernel in a subsequent convolutional layer, the input data may be from one or more feature maps from a previous layer of the CNN. As such, the value of n will be the number of feature maps from the previous layer.

Convolution generally involves multiplying each pixel of an input region 111 (in this example a 3×3 image region) by a weight in the kernel 210 before adding the result of this operation to the result of the same operation applied to neighboring pixels or neighboring feature map elements. A stride for example refers to the number of pixels or feature map elements a kernel 210 is moved by between each operation. A stride of 1 therefore indicates that, after calculating the convolution for a given 3×3 image region, the kernel is moved across the image by 1 pixel and the convolution is calculated for a subsequent image region. This process may be repeated until the kernel has been convolved with the entire image, the entire portion of the image for which a convolution is to be calculated, or with the entirety of a feature map the kernel is to be convolved with. A convolution generally involves a multiplication operation and an addition operation (sometimes referred to as a multiply-accumulate operation). Thus, a neural network accelerator, which may be dedicated to implementing a neural network, may include a multiplier-accumulator (MAC) unit configured to perform these operations.

In the example of FIG. 2, the region 111 of the input data 110 is multiplied with the weights of the kernel 210 before accumulation 220. In cases where the input data 110 has n number of channels, the kernel 210 will have n number of channels i.e. a matrix of 3×3×n. A bias value may then be applied to the accumulated result 220. The resulting convolved output 225 may then be input into an activation function 230.

The input value 225 is passed through the activation function 230, creating an output value 235. The activation function 230 of the neuron determines whether the neuron 'activates'. For example, for a rectified linear unit (ReLU) activation function, the neuron will only activate if the kernel 210 convolving the region 111 has identified the features the kernel 210 is looking for. As such, the multiply-and-accumulating 220 will result in a high or positive input value 225 to the activation function 230. This results in a high output value 235, in other words, the neuron is 'activated'.

In another example, the kernel 210 convolving the region 111 does not identify the features the kernel 210 is looking for. As such, the multiplying-and-accumulating 230 will result in a low or negative input value 225 to the activation function 230. This results in an output value 235 of zero i.e. the neuron is not 'activated'.

An activation function (sometimes referred to as a rectifier) may be used to map a first range of values to a pre-determined second range of values, such as a range between zero and one. The activation function may be used to increase the nonlinear output of the neuron and is therefore often a non-linear function. Examples of activation functions include an identity function, a binary step function, a logistic function, an inverse square root function, a sigmoid function (schematically shown in the activation function 230 in FIG. 2), a hyperbolic tangent function, a rectified linear unit (ReLU) function and a leaky ReLU function, although other activation functions are possible. By using an activation function, the amount of data to be processed may be reduced (as some inputs may be mapped to 0 to create a zero output, and therefore may not require further processing). Furthermore, the output data after application of an activation function may contain many zeroes and small values, and therefore can be compressed. The compressed output data may thus have lower storage requirements, and may be transferred with a reduced bandwidth Referring back to the example in FIG. 1, wherein the input data comprises image data, the convolutional layer 120 may involve the convolution of 64 different kernels with the input data 110 of the first layer. Each of the 64 kernels is for example arranged to identify a different respective feature of the image data. In the example of FIG. 1, whereby the CNN is used to identify animals from static photographic images, the 64 kernels of convolutional layer 120 may be used to identify features such as lines, curves, edges etc. Further convolutional layers, such as 140, may be used to identify more sophisticated features, based on the combined features of those identified in the previous layer 120 e.g. trunk, paws, beak, mane etc. Therefore, as the input data 110 is processed by the CNN 100, different kernels will be activated depending on which features are identified. The fully connected layer 160 may then use the features identified by the kernels to classify the input data 110 into various outputs e.g. elephant 170a, tiger 170b, swan 170c, horse 170d.

In the example of FIG. 1, in which the input data is 224×224 pixels, with 3 color channels, and is convolved with 64 kernels of a size of 3×3 pixels, the convolutional layer 120 of the CNN 100 involves 224×224×3×(3×3)×64 multiply-accumulate operations, i.e. 86 million multiply-accumulate operations. There will also be a large number of further multiply-accumulate operations associated with further convolutional layers 140 of the CNN 100, which involve convolving the output of the previous layer 130 with e.g. 256 kernels. As will be appreciated, though, other neural networks may involve convolutions with a different number of kernels. Nevertheless, classification of an image using a neural network typically involves a large number of data processing operations, each of which consumes power. Reduction of the number of data processing operations, while still retaining the same classification accuracy and efficiency, may save processing power.

Such a reduction of the number of data processing operations may be possible by identifying regions of input data that may not need to be processed. In an illustrative example of image data, the image data may contain a region where all the pixels of the region have the same value. For example, a static photographic image of a tree may contain a region of blue sky i.e. all the pixels of the region (corresponding to the blue sky) have the same blue pixel value. A CNN may be, for example, configured to perform objection recognition for trees in static photographic images. As such, the kernels and layers of the CNN may be configured to identify such characteristics of trees. For example, but certainly not limited to, such characteristics as leaves, bark, trunk etc. In such an example, the region of blue sky in the static photographic image may be processed by a kernel (configured to identify a particular feature e.g. bark) in the CNN and produce a zero output, as the region does not contain the particular feature the kernel is configured to identify. As such, if a region of image data is known to not contain the particular feature configured to be identified by the kernel, the region may not need to be processed i.e. it is known that processing the region will produce a zero output.

Identifying regions of image data that may not need to be processed with a kernel before the region of image data is processed with the kernel may allow the processing of the kernel to be eliminated for said region of image data. Association data may be obtained that relates the kernel to one or more known data patterns. Determining whether to process the region of input data with the kernel may be based on the analysis of the input data and the association between the kernel and the known data patterns. Conducting an analysis of the input data allows for the identification of one or more regions of input data that corresponds to one or more known data patterns. Obtaining the association data allows the association between the one or more known data patterns and the kernel to be determined, thus allowing determination of whether to process the region of input data with the kernel can be eliminated.

In a first illustrative example, if a region of input data corresponds to a known data pattern and the association data determines that processing the known data pattern with the kernel generates a, for example, zero output, then the region of input data may not need to be processed with the kernel. In a second illustrative example, if a region of input data corresponds to a known data pattern and the association data determines the processing the known data pattern with the kernel generates an output of, for example, one, then the region of input data may need to be processed with the kernel. In a third illustrative example, if a region of input data does not correspond to a known data pattern, then the region of input data may need to be processed with the kernel.

A region of data may correspond to one or more data patterns. In some examples, a data pattern may comprise a region of data whereby each value of data in the region may match a data pattern definition. The data pattern definition may define values that each value of data in the region may have. Examples of a data pattern may include, but are not limited to, a region of data whereby each value of data in the region has the same value, is within a pre-determined range of values, has a pre-determined value or all values have a pre-determined relationship.

In some examples, input data may comprise image data. As such, a data pattern may be considered to be an image pattern. An image pattern may comprise a plurality of pixels (i.e. a region of image data) wherein all values of the pixels in the plurality of pixels are the same value, are a pre-determined value, are within a pre-determined range of values and/or have a pre-determined relationship. In one illustrative example, an image may contain an image region that has the same value for all the pixels in said region. As such, the region may be considered to correspond to an image pattern. In another illustrative example, an image may contain an image region whereby the values for all the pixels in said region have a pre-determined relationship e.g. correspond to a lighter or darker color.

In some examples, an image pattern may comprise a plurality of pixels wherein all pixels have a pre-defined depth and/or are within a pre-defined range of depths. The depth, which may be referred to as color depth or bit depth, corresponds to the number of bits that is used to indicate the color of a pixel. The depth of a pixel may be, but is certainly not limited to, 1-bit, 8-bit, 16-bit, 24-bit, 48-bit etc. The higher the depth of the image data, the greater the color precision.

In other examples, an image pattern may comprise an image region whereby the values of the pixels in said region change at a certain rate. The rate of change may correspond to the amount of change from a first value of a first pixel to a second value of a second pixel in the image region. For example, the values of the pixel in the image region may slowly change across said region i.e. from a lighter blue color to a darker blue color. In such cases, the rate of change (of the values of the blue pixels) would be determined to be a low rate of change. For a given image pattern, the rate of change of the values of the pixels may be a pre-defined rate or within a pre-defined range of rates. As such, the image pattern may comprise a plurality of pixels wherein all pixels have a pre-defined rate of change and/or are within a pre-defined range of rates of change.

In other examples, input data may comprise audio data. As such, a data pattern may be considered to be an audio pattern. The audio pattern may comprise a range of frequencies (i.e. a region of audio data) wherein the value of the amplitude information in the range of frequencies may be the same value, a pre-determined value, within a pre-determined range of values and/or have a pre-determined relationship. In an illustrative example, an audio track may contain a range of frequencies that has the same amplitude information for all the frequencies in said range. As such, the frequency range may be considered to correspond to an audio pattern. In another illustrative example, an audio track may contain amplitude information for frequencies that have a pre-determined relationship e.g. correspond to louder or quieter sounds.

Figure 3:
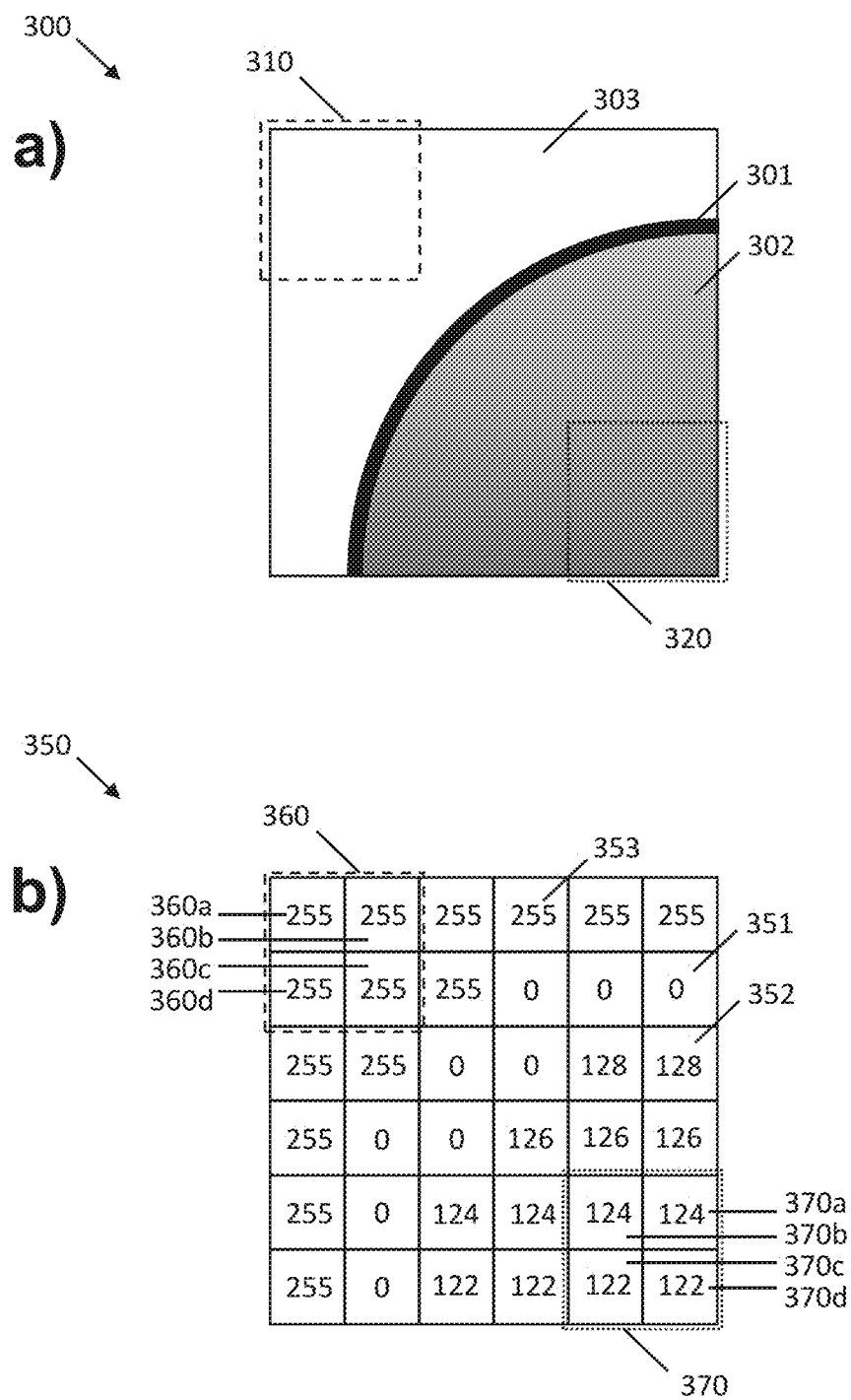
FIG. 3 is a schematic representation of examples of input data.

FIG. 3 is a schematic representation of examples 300, 350 of input data. In the illustrative example of FIG. 3, the input data comprises image data.

FIG. 3a is a schematic representation of an image 300, in which the image 300 is 224×224 pixels with a single color channel. The image 300 shows a sector of a circle, wherein the edge of the circle is a thick black line 301 and the inside of the circle is a grey color gradient 302, on a white background 303. The dashed box 310 encloses a region 310 of the white background 303 of the image 300. The dotted box 320 encloses a region 320 of the grey color gradient 302.

FIG. 3b is a schematic representation of the image 300 as image data 350. The image 300 of FIG. 3a is shown in pixel representation as image data 350. While the image 300 is 224×224 pixels, the image data 350 is shown as 6×6 pixels for simplicity and to aid understanding. The image data 350 represents the image 300 as a plurality of pixels, whereby each pixel 351, 352, 353 etc. shows the pixel value of the single color channel. The thick black line 301 of FIG. 3a is represented by at least the pixel 351 with a value of '0'. Similarly, the grey color gradient 302 of FIG. 3a is represented by a range of pixel values from '122' to '128' i.e. at least pixel 352. Finally, the white background 303 of FIG. 3a is represented by at least the pixel 353 with a value of '255'.

The dashed box 360 encloses a 2×2 pixel region 360 containing four pixels 360a-d. Each of the four pixels 360a-d have the pixel value '255' as the dashed box 360 encloses region 360 corresponding to region 310 of FIG. 3a i.e. the white background 303 of the image 300. The region 360 of the image data 350 may be considered to be a first image pattern. This is because the region 360, comprising of a plurality of pixels wherein all values of the pixels in the plurality of pixels are the same value, contains four pixels 360a-d that all have the pixel value '255'. In other words, the region 360 matches a data pattern definition, whereby the data pattern definition defines that each value is '255'.

The dotted box 370 encloses a 2×2 pixel region 370 containing four pixels 370a-d. The four pixels 370a-d have a range of pixel values from '122' to '124' as the dotted box 370 encloses region 370 corresponding to region 320 of FIG. 3a i.e. the grey color gradient 302 of the image 300. Similarly, the region 370 of the image data 350 may be considered to be a second image pattern. The region 360 contains four pixels 370a-d that have a range of values from '122' to '124'. Therefore, if a pre-determined range of values was determined to be between '120' and '130', then a plurality of pixels wherein all the values of the pixels are within the pre-determined range of '120' to '130' would correspond to the second image pattern. As such, the region 370 is considered to correspond to the second image pattern. In other words, the region 370 matches a data pattern definition, whereby the data pattern definition defines that each value is between '120' and '130'.

Figure 4:
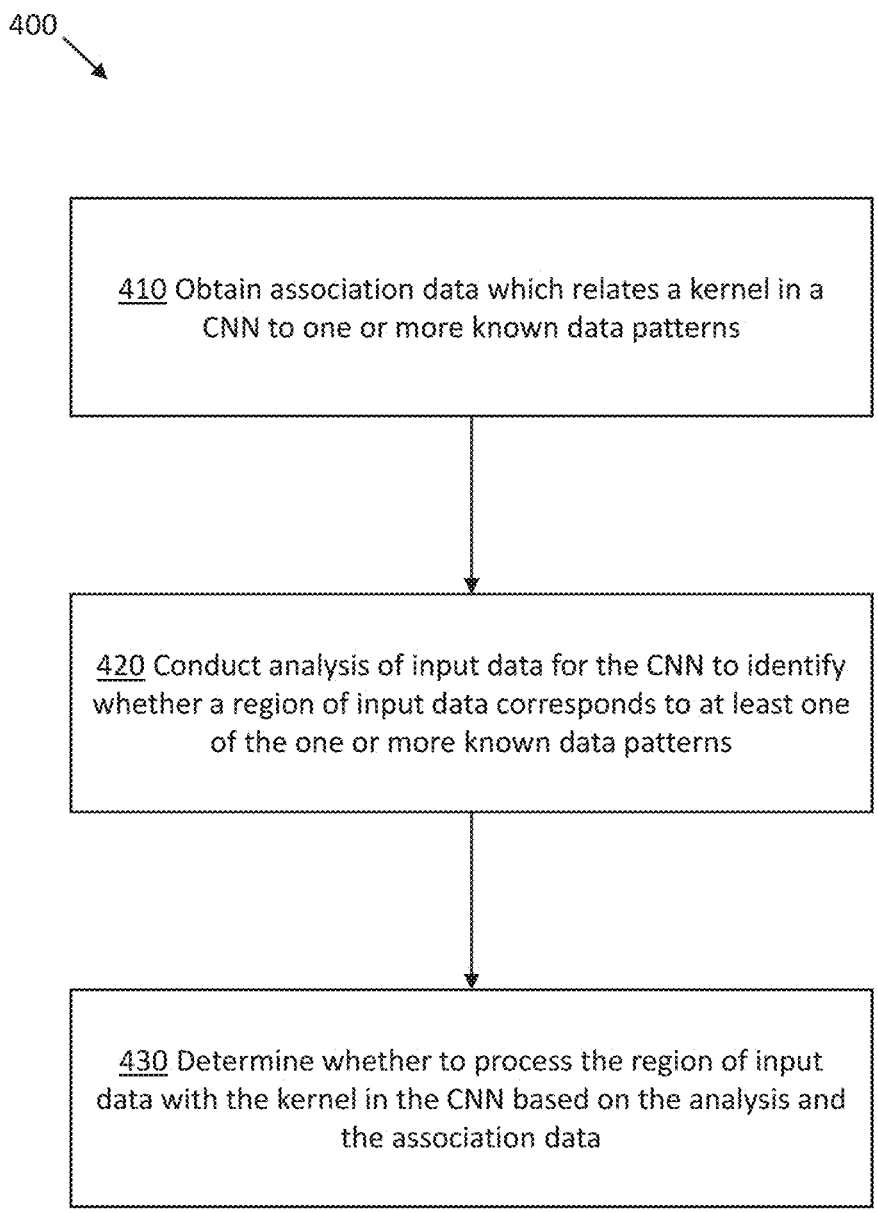
FIG. 4 is a block diagram of a method of processing input data.

FIG. 4 is a block diagram of a method 400 of processing input data in a CNN. In some example, the CNN may comprise an input layer, a first layer and one or more subsequent layers, as previously described in relation to FIG. 1. In some examples, the input data may comprise image data or audio data.

In some examples, one or more component layers of the CNN may be fused together. The one or more component layers may be referred to as fused convolutional layers. In such fused layers, the processing of the one or more component layers may be fused i.e. the processing may be performed for the one or more component layers together.

In block 410, the method 400 obtains association data which relates a kernel in the CNN to one or more known data patterns. The association data relates the kernel in the CNN to the one or more known data patterns. In some examples the data pattern may comprise a region of data whereby all the values of the data in the region are (but are certainly not limited to): the same value; within a pre-determined range of values; a pre-determined value; or have a pre-determined relationship.

In some examples the input data may comprise image data, wherein the image data may comprise a first plurality of pixels. Similarly, the data pattern may comprise an image pattern, wherein the image pattern may comprise a second plurality of pixels. In further examples, the image pattern may comprise a second plurality of pixels whereby all pixels in the second plurality of pixels are (but are certainly not limited to): the same value; within a pre-determined range of values; a pre-determined value; or have a pre-determined relationship.

In some examples, the association data may be generated by pre-processing one or more known data patterns with the kernel to determine one or more data-pattern outputs of the kernel. Pre-processing the data pattern with the kernel may comprise convolving the data pattern with the kernel to generate a convolved output of the kernel. Pre-processing the data pattern with the kernel may further comprise processing the convolved output of the kernel using an activation function to determine a data-pattern output of the kernel.

In further examples, determining the data-pattern output of the kernel allows determination of how the data pattern relates to the kernel. In an illustrative example for a kernel configured to identify a particular feature and configured with a ReLU activation function, the data-pattern output of the kernel may be zero or negligible. As such, it may be inferred that the kernel did not identify the particular feature in the data pattern. In a different illustrative example for a kernel configured to identify a different feature, a data-pattern output of the kernel may be one or close to one. As such, it may be inferred that the kernel did identify the different feature in the data pattern.

In some examples, the association data may be stored in memory of the input-data processing system. In order to obtain the association data, the association data may be retrieved from memory.

In some examples, one of the one or more known data pattern may be selected from a plurality of pre-determined data patterns. The plurality of pre-determined data patterns may be determined upon configuration of the input-data processing system. In an illustrative example for image data, such pre-determined data patterns may include, but are certainly not limited to, data patterns that correspond to white or cream regions of image data (e.g. walls), blue regions (e.g. sky), green regions (e.g. grass) and/or grey regions (e.g. road). The selection of the known data pattern from the plurality of pre-determined data patterns may be based on auxiliary information of the input data. Such auxiliary information may comprise location information of the input data. Returning to the illustrative example, if the location information of the input data suggests the input data corresponds to a field, then the data pattern that corresponds to blue and/or green regions (e.g. sky and grass) may be selected. If the location information of the input data is null or missing, then the data pattern that corresponds to white or cream regions (e.g. walls) may be selected as the input data may correspond to inside a building (and therefore no GPS signal or location information).

In some examples, the input data may be used to determine one of the one or more known data patterns. Determining a data pattern from input data may be performed for compressed input data. In such examples, a known data pattern may be determined by analyzing compression metadata information of the input data. Data compression algorithms or protocols may be used to compress input data in order to reduce the memory footprint of the input data. The resulting compressed input data may comprise compression metadata information. Said compression metadata information may indicate if regions of the input data correspond to a known data pattern. For example, compression of a static photographic image (e.g. a tree in a field) may produce compression metadata information that indicates that a region of the image data is all the same color (e.g. a green region corresponding to the grass).

Analyzing compression metadata information may identify regions of input data that are known to correspond to data patterns. For example, the data pattern may correspond to a solid color (i.e. where all pixels are the same value), a range of colors (i.e. where all pixels are within a pre-defined range of colors, have the same rate of change of color or are within a range of rates of change), or a particular or range of depths (i.e. where all the pixels have the same bit depth or are within a range of bit depths).

In further examples, the compression metadata information of the input data may be generated on the fly from the input data. Generation of the compression metadata information may be performed during storing the input data to memory or during retrieving the input data from memory. In some examples, the compression metadata information of the input data may be generated when writing an output feature map to storage. The output feature map may be used as input data (i.e. an input feature map) for a subsequent layer of the CNN. The storage may be a local storage in the input data processing system.

In block 420, the method 400 conducts analysis of input data for the CNN to identify whether a region of input data corresponds to at least one of the one or more known data patterns. In some examples, analysis of the input data may determine that the region of input data does not correspond to at least one of the one or more known data patterns. In such cases, it may be determined to process the region of input data with the kernel in the CNN.

In other examples, analysis of the input data may determine that the region of input data does correspond to at least one or the one or more known data patterns. Determination on whether to process the region of input data with the kernel may be further based on the association data which relates the kernel to the one or more known data patterns.

In block 430, the method 400 determines whether to process the region of input data with the kernel in the CNN based on the analysis and the association data.

In some examples, it may be determined to process the region of input data with the kernel in the CNN as a result of determining one or more known data patterns being associated with the kernel in the association data. For example, the association data may determine that the region of input data corresponding to one or more known data patterns should be processed with the kernel.

In some examples, it may be determined to process the region of input data with the kernel in the CNN as a result of determining one or more known data patterns have not been identified in the analysis. In other words, the region of input data does not correspond to one or more known data patterns, and therefore the region of input determine should be processed with the kernel.

In some examples, it may be determined to not process the region of input data with the kernel in the CNN as a result of determining one or more known data patterns being associated with the kernel in the association data and being identified in the analysis. In other words, the region of input data corresponds to one or more known data patterns and the association data determined that the regions corresponding to one or more known data patterns should be processed with the kernel.

In further examples, determining to not process the region of input data with the kernel in the convolutional network may be based, at least in part, on the one or more data-pattern outputs of the kernel. For example, the association data may determine the data-pattern output of the kernel. Therefore, from the data-pattern output, it can be determined whether to process the region of input data (that corresponds to the data pattern) with the kernel. As an example, if the region of input data corresponds to a data pattern that produced a zero or negligible output of the kernel, it may be determined to not process the region of input data. Alternatively, if the region of input data corresponds to a data pattern that produced a non-negligible output of the kernel, it may be determined to process the region of input data.

In some examples, processing the region of input data with the kernel in the CNN may comprise convolving the region of input data with the kernel to generate a convolved output of the kernel and processing the convolved output of the kernel using an activation function to determine a data-region output of the kernel.

In some examples, determining to not process the region of input data with the kernel may further comprise determining a value for the data-region output of the kernel. In some examples, the region of the input data may correspond to the data pattern. As such, the value for the data-region output of the kernel may be considered equivalent to the value of the data-pattern output of the kernel.

In some examples, the input data may comprise the input layer of the CNN. In such examples, the kernel, which is related by the association data to one or more known data patterns, and with which the region of the input layer is to be processed, is in the first layer. In other words, the input data may be the input layer, and the kernel may be a first kernel in a first layer of the CNN.

In further examples, subsequent association data may be obtained. The subsequent association data may relate a subsequent kernel in a subsequent layer of the CNN to one or more known data patterns. Furthermore, it may be determined whether to process the region of input data with the subsequent kernel in the CNN based on the analysis and the subsequent association data.

In further examples, the subsequent association data may be generated by pre-processing one or more known data patterns with the subsequent kernel to determine one or more data-pattern outputs of the kernel. Pre-processing the data pattern with the subsequent kernel may comprise convolving the data pattern with the subsequent kernel to generate a subsequent convolved output of the kernel. Pre-processing the data pattern with the subsequent kernel may further comprise processing the subsequent convolved output of the kernel using an activation function to determine a subsequent data-pattern output of the kernel. Based on the subsequent association data, it may be determined whether to process the region of input data for the subsequent kernel in the subsequent layer of the CNN.

In other examples, the input data may comprise an input feature map of the CNN. In such examples, the kernel, which is related by association data to one or more known data patterns, and with which the region of the input feature map is to be processed, is in a subsequent layer. In other words, the input data may be an input feature map, and the kernel may be a subsequent kernel in a subsequent layer of the CNN. This subsequent layer may or may not be the same subsequent layer of the previous example.

In some examples, it may be determined to disable the analysis of the input data for a pre-determined time. Disabling the analysis of the input data may be based on the frequency of identification of the region of input data that corresponds to the data pattern. If the input data frequently corresponds to the data pattern, it may be determined to continue to analyze the input data. As a result, it may often be determined that the input data need not be processed by the kernel of the CNN. If the input data frequently does not correspond to the data pattern, it may be determined to disable the analysis of the input data. As a result, the input data may be processed by the kernel of the CNN. In further examples, the analysis may be periodically re-enabled in order to determine whether the input data corresponds to the data pattern or not. The period of re-enablement of the analysis may be pre-configured for the input-data processing system or calculated on the fly by the input-data processing system.

Figure 5:
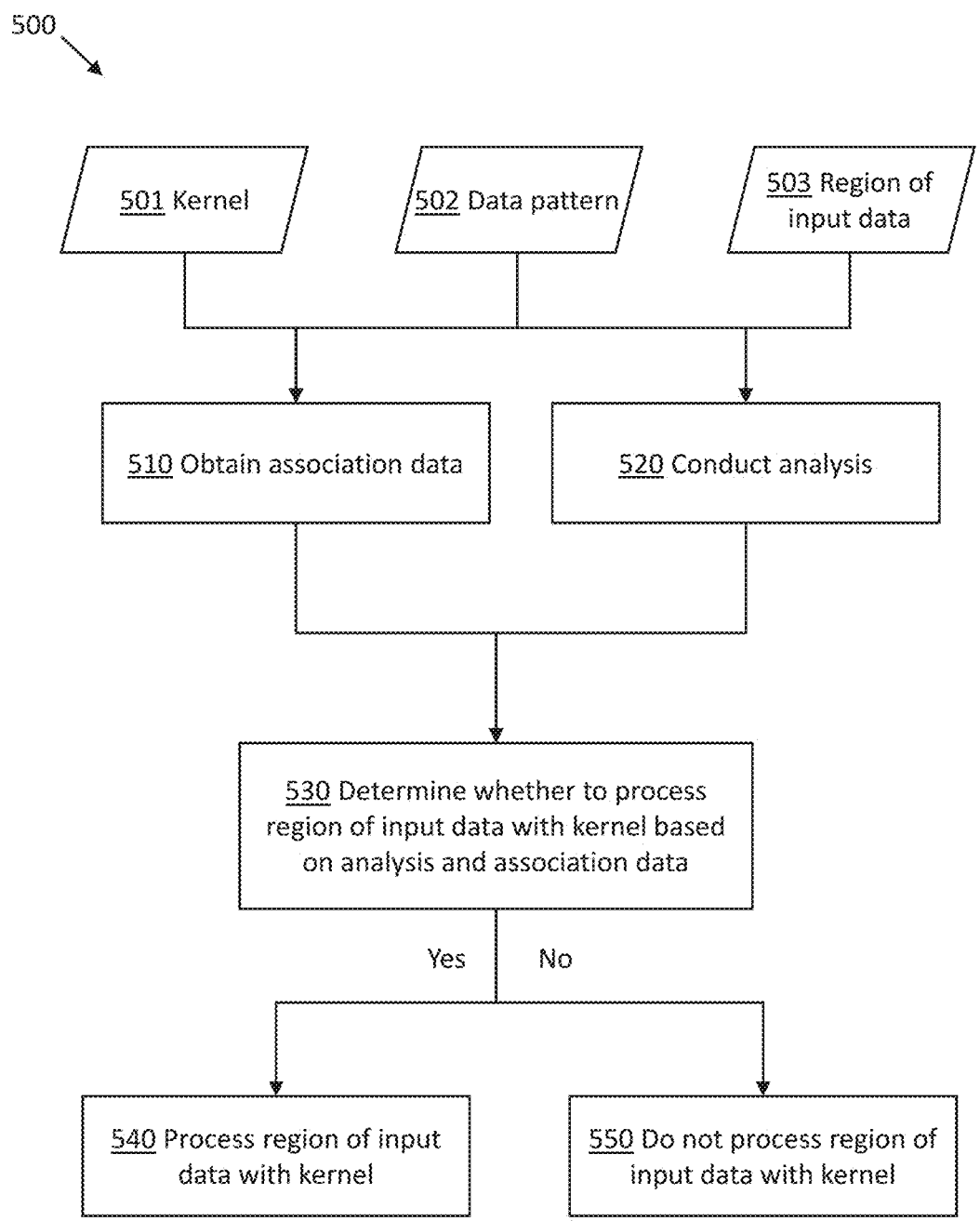
FIG. 5 is a flowchart showing a method of processing input data.

FIG. 5 is a flowchart 500 showing a method of processing input data. In step 510 of the flowchart 500, association data is obtained. The association data may be retrieved from storage of the input-data processing system. The association data relates a kernel 501 in a CNN to one or more known data patterns 502. In order to generate the association data, the data pattern 503 may be pre-processed by the kernel 501 to generate a data-pattern output. The data-pattern output thus determines how the kernel 501 relates to the data pattern.

In some examples, association data may be represented by a data file. The data file may contain representations of at least one kernel 501 and at least one data pattern 502. The data file may further comprise representations of a data-pattern output generated by processing a data pattern with a kernel. As such, for a region of input data 503 that corresponds to a data pattern 502, the association data may be able to determine to not process the region of input data 503. Furthermore, the association data may be able to determine what the output of the kernel would be for the region of input data 503.

In other examples, the data file may contain representations of at least one kernel and at least one data pattern definition. The data pattern definition may define the values that the region of input data may need to have, in order for the region of input data to not be processed by the kernel. In other words, the data pattern definition provides values (or a range of values) that the region of input data may be in order to eliminate processing for the kernel. As such, for a region of input data that corresponds to a data pattern, the association data may be able to determine to not process the region of input data as the values of the region of input data correspond to the data pattern definition.

In step 520 of the flowchart 500, an analysis is conducted to identify whether a region of input data 503 corresponds to at least one of the one or more known data patterns 502. The step 510 of obtaining the association data and the step 520 of conducting the analysis may be performed in any order or in parallel. Following at least one of the steps 510, 520, the flowchart 500 may then follow a path to step 530, where it is determined whether to process the region of input data 503 with the kernel 501 based on the analysis of step 520 and the association data of step 510.

In examples where a region of input data 503 is not identified as corresponding to a data pattern 502, it may be determined to process the region of input data 503 with the kernel 501. This is because there is no region of input data 503 that corresponds to the data pattern 502, and as such, it has not already been determined what output of the kernel would be generated when the region of input data 503 is processed with the kernel 501. The flowchart 500 may then follow a path to step 540, where it is determined to process the region of input data 503 with the kernel 501, on account of the region of input data 503 not corresponding to the data pattern 502.

In examples where a region of input data 503 is identified as corresponding to a data pattern 502, it may be determined whether to process the region of input data 503 with the kernel 501 based on the association data. For example, the association data may contain the data-pattern output of the kernel. In other words, it has already been determined what output of the kernel is generated when the region of input data 503 (which corresponds to the data pattern) is processed with the kernel 501.

The data-pattern output may indicate if the kernel (configured to identify a particular feature) has indeed identified the particular feature. In an illustrative example where the kernel is configured with a ReLU activation function, if the kernel identifies the particular feature, the data-pattern output may be one or close to one. If the kernel does not identify the particular feature, the data-pattern output may be zero or negligible.

In some examples, the association data may indicate that the region of input data 503 (which corresponds to the data pattern 502) should be processed by the kernel 501. For example, if the data-pattern output indicates that the kernel 501 has identified a particular feature. The flowchart 500 may then follow a path to step 540, where it is determined to process the region of input data 503 with the kernel 501, based on the determination of the association data.

In other examples, the association data may indicate that the region of input data 503 (which corresponds to the data pattern 502) should not be processed by the kernel 501. For example, if the data-pattern output indicates that the kernel 501 has not identified a particular feature. In other words, the processing of this region of input data 503 with the kernel may be eliminated. The flowchart 500 may then follow a path to step 550, where it is determined to not process the region of input data 503 with the kernel 501, based on the determination of the association data. In further examples, the data-region output of the kernel may be determined to be equivalent to the data-pattern output of the kernel.

Figure 6:
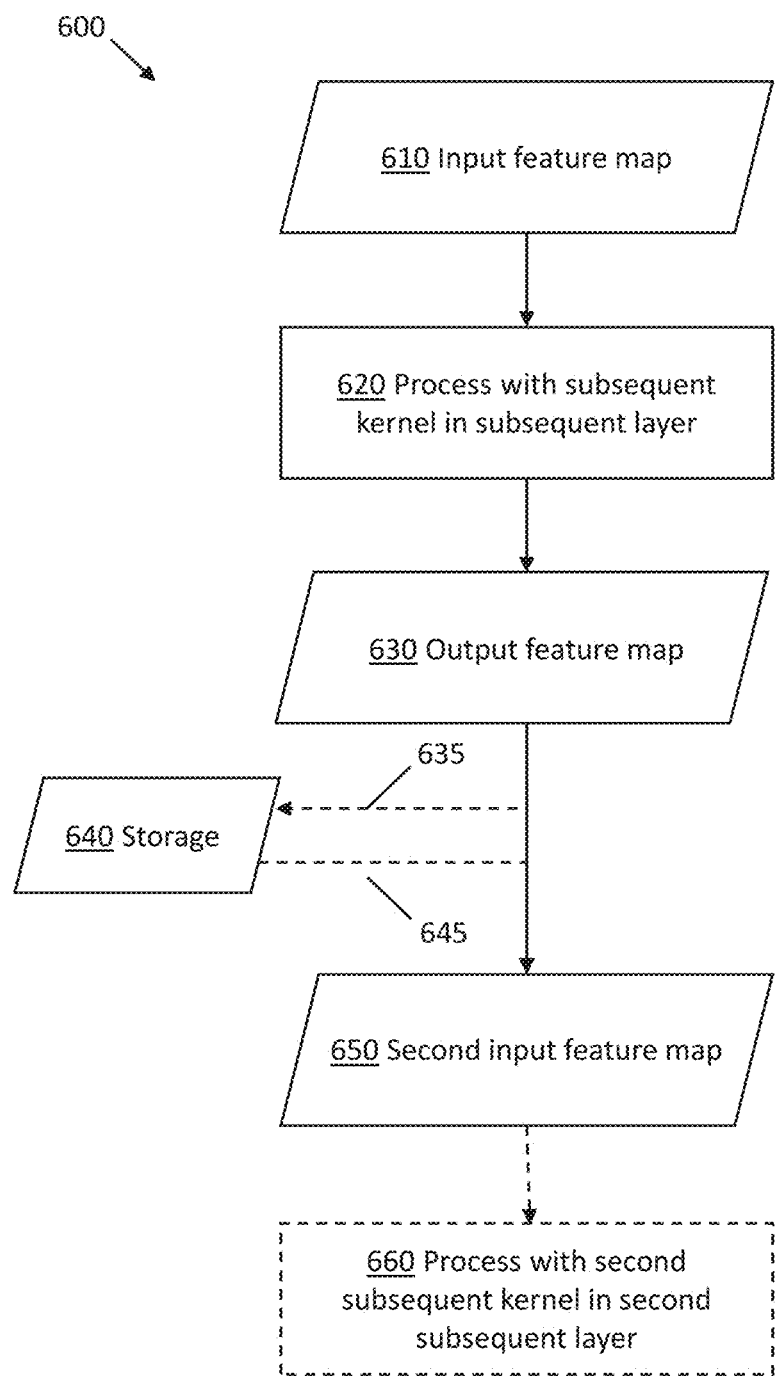
FIG. 6 is a flowchart showing a method of processing input feature map data.

FIG. 6 is a flowchart 600 showing a method of processing input feature map data. In step 610 of the flowchart 600, the input data comprises an input feature map. An input feature map may be considered to be equivalent to an output feature map from a layer of the CNN. The feature map that is outputted from the layer is known as an output feature map. When the feature map is inputted into a subsequent layer of the CNN, the feature map is known as an input feature map.

In step 620 of the flowchart 600, the input feature map 610 may be processed with a subsequent kernel in a subsequent layer of the CNN. Processing the input feature map with the kernel may comprise convolving the input feature map with the kernel to generate a convolved output of the kernel. Processing the input feature map with the kernel may further comprise processing the convolved output of the kernel using an activation function to determine an output feature map 630 of the kernel. In step 630 of the flowchart, the output of the kernel comprises an output feature map. In some examples, it may be determined to not process the input feature map using the method 500 described in relation to FIG. 5.

In some examples after generation of the output feature map 630, the output feature map 630 may be written to storage 640. The storage 640 may be local storage of the input-data processing system.

In some example, the output feature map may be compressed before being written to storage. As such, compression metadata may be generated on the fly from the output feature map. Generation of the compression metadata information may be performed during storing the output feature map 630 to memory or storage 640.

In some examples, the compression metadata may be generated by a CNN accelerator separately from the compression data. In other examples, the compression metadata may be generated by the CNN accelerator from input data that may be not be compressed. Therefore, when analysis is conducted to identify whether a region of input data corresponds to a data pattern, the metadata of the input data (rather than the input data itself) may be analyzed. As such, the processing power required to analyze the input data may be reduced.

In other examples, compression metadata may be generated on the fly from the output feature map during retrieving the output feature map from memory or storage 640. The output feature map may then be used as a second input feature map 650 for a second subsequent layer of the CNN. As such, the compression metadata is generated by the CNN when the input data is read in as an input feature map 650.

In step 660 of the flowchart 600, the second input feature map 650 may be processed with the second subsequent kernel in the second subsequent layer of the CNN, as described above. In some examples, it may be determined to not process the second input feature map 650, using the method 500 described in relation to FIG. 5.

Figure 7:
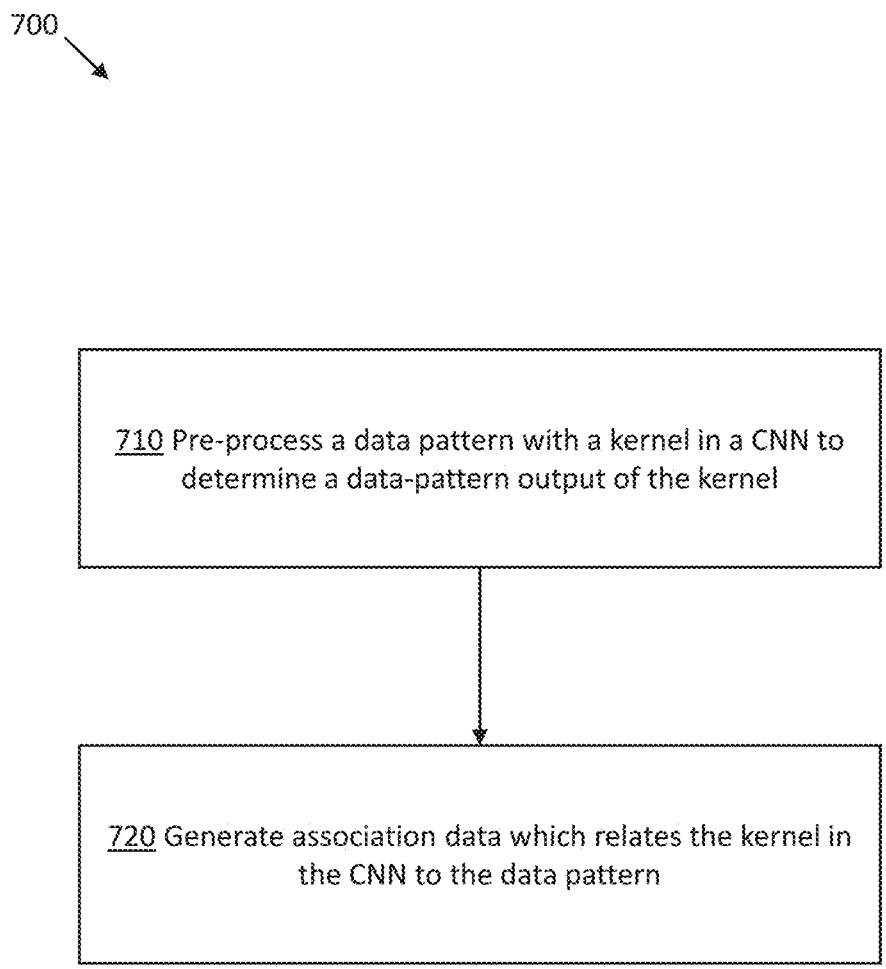
FIG. 7 is a block diagram of a method of pre-processing a data pattern.

FIG. 7 is a block diagram of a method 700 of pre-processing a data pattern. In some examples, the method 700 may be considered to be a training phase of the CNN. The training phase may be performed by the input-data processing system. The method 700 may be performed by the CNN, prior to the method 400 of processing input data.

In other examples, the method 700 may be considered to be a pre-processing method. The pre-processing method may be performed by a second system, different from the input-data processing system.

In block 710, the method 700 pre-processes a data pattern with a kernel in a CNN to determine a data-pattern output of the kernel. Pre-processing the data pattern with the kernel may comprise convolving the data pattern with the kernel to generate a convolved output of the kernel. Pre-processing the data pattern with the kernel may further comprise processing the convolved output of the kernel using an activation function to determine a data-pattern output of the kernel. The data-pattern output may indicate if the kernel (configured to identify a particular feature) has indeed identified said particular feature In block 720, the method 700 generates association data which relates the kernel in the CNN to the data pattern. In some examples, the association data may indicate that the data pattern should be processed by the kernel. For example, if the data-pattern output indicates that the kernel has identified a particular feature. In other examples, the association data may indicate that the data pattern should not be processed by the kernel. For example, if the data-pattern output indicates that the kernel has not identified a particular feature.

In some examples, association data may be represented by a data file. The data file may contain representations of at least one kernel and at least one data pattern. The data file may further comprise representations of a data-pattern output generated by processing a data pattern with a kernel. As such, for a region of input data that corresponds to a data pattern, the association data may be able to determine to not process the region of input data, and as a result, what the output of the kernel would be.

In other examples, the data file may contain representations of at least one kernel and at least one data pattern definition. The data pattern definition may define the values that the region of input data may need to have, in order for the region of input data to not have to be processed by the kernel. In other words, the data pattern definition provides values (or a range of values) that the region of input data may be in order to eliminate processes for the kernel. As such, for a region of input data that corresponds to a data pattern, the association data may be able to determine to not process the region of input data as the values of the region of input data correspond to the data pattern definition.

The association data may be stored in internal storage of the input-data processing system. Alternatively, the association data may be stored in external storage.

Figure 8:
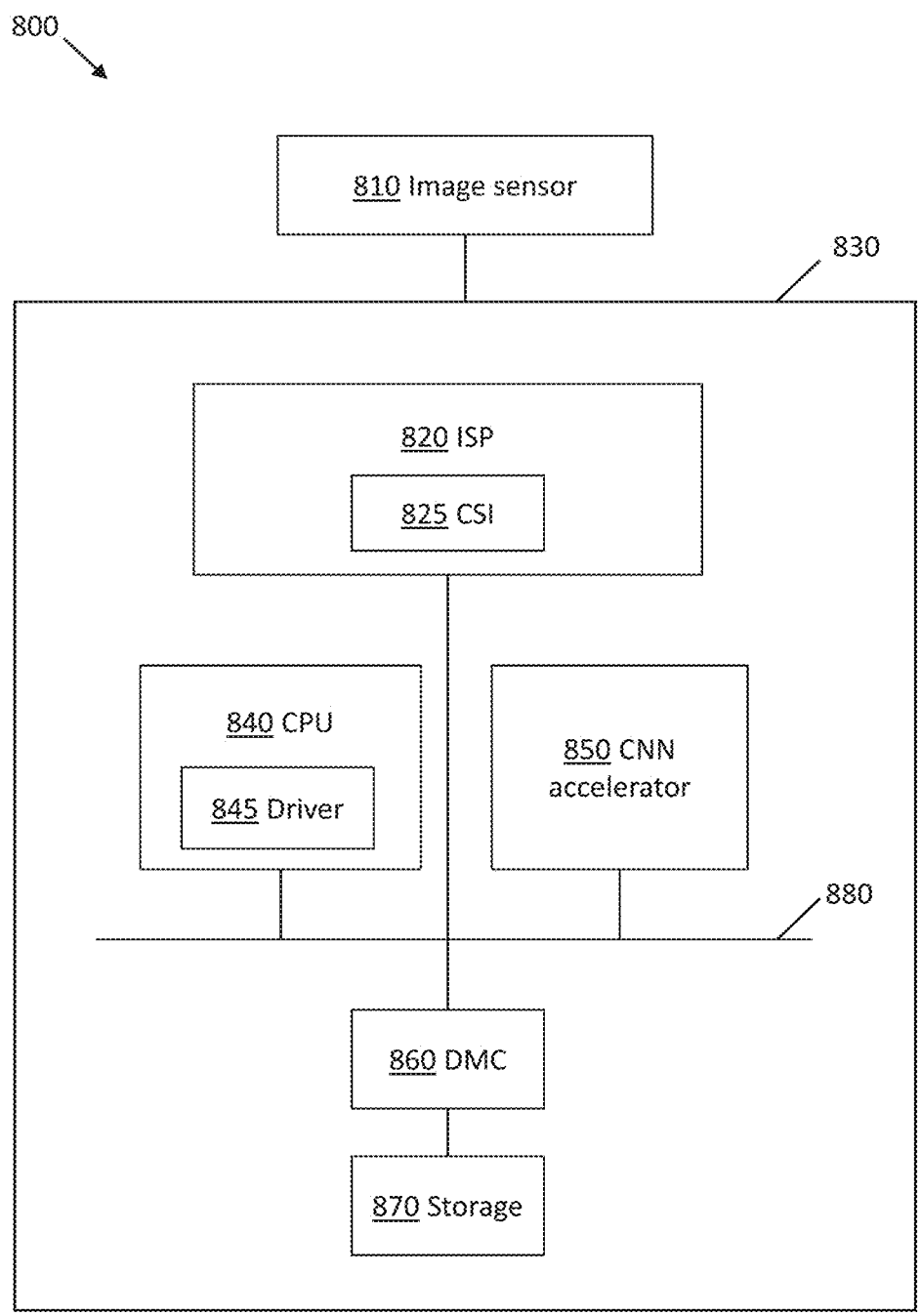
FIG. 8 is a schematic representation of a system for processing input data.

FIG. 8 is a schematic representation of a system 800 for processing input data for use with the methods described herein. In some examples, input data may comprise image data. The image processing system 800 of FIG. 8 may be coupled to or form part of a computer device, such as a personal computer, a laptop, a smartphone or an on-board computer device which may be coupled to or mounted within a vehicle such as a car.

The image processing system 800 includes an image sensor 810. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 810 in this example is arranged to capture image data, which may be in the form of a series of images captured sequentially, with each image corresponding to a frame of a video. In other examples, image data may be provided by a video decoder. The video decoder may obtain frames of video from a video file or a video conferencing system.

In FIG. 8, the image sensor 810 is arranged to transfer image data to an image signal processor (ISP) 820 of a computing system 830 via a camera serial interface (CSI) 825. The ISP 820 may perform initial processing of image data (such as individual frames of the video) to prepare the video for display. For example, the ISP 820 may perform saturation correction, renormalization, white balance adjustment and/or demosaicing, although this is not to be taken as limiting.

The computing system 830 includes at least one processor. The at least one processor is for example configured to perform the methods described herein. In this example, the computing system 830 includes a central processor unit (CPU) 840. The computing system 830 also includes a neural network accelerator 850, which is a processor dedicated to implementing at least classification of data using a neural network. For example, the neural network accelerator 850 may be configured to implement a neural network such as the CNN described above.

In other examples, though, the computing system 830 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

Figure 9:
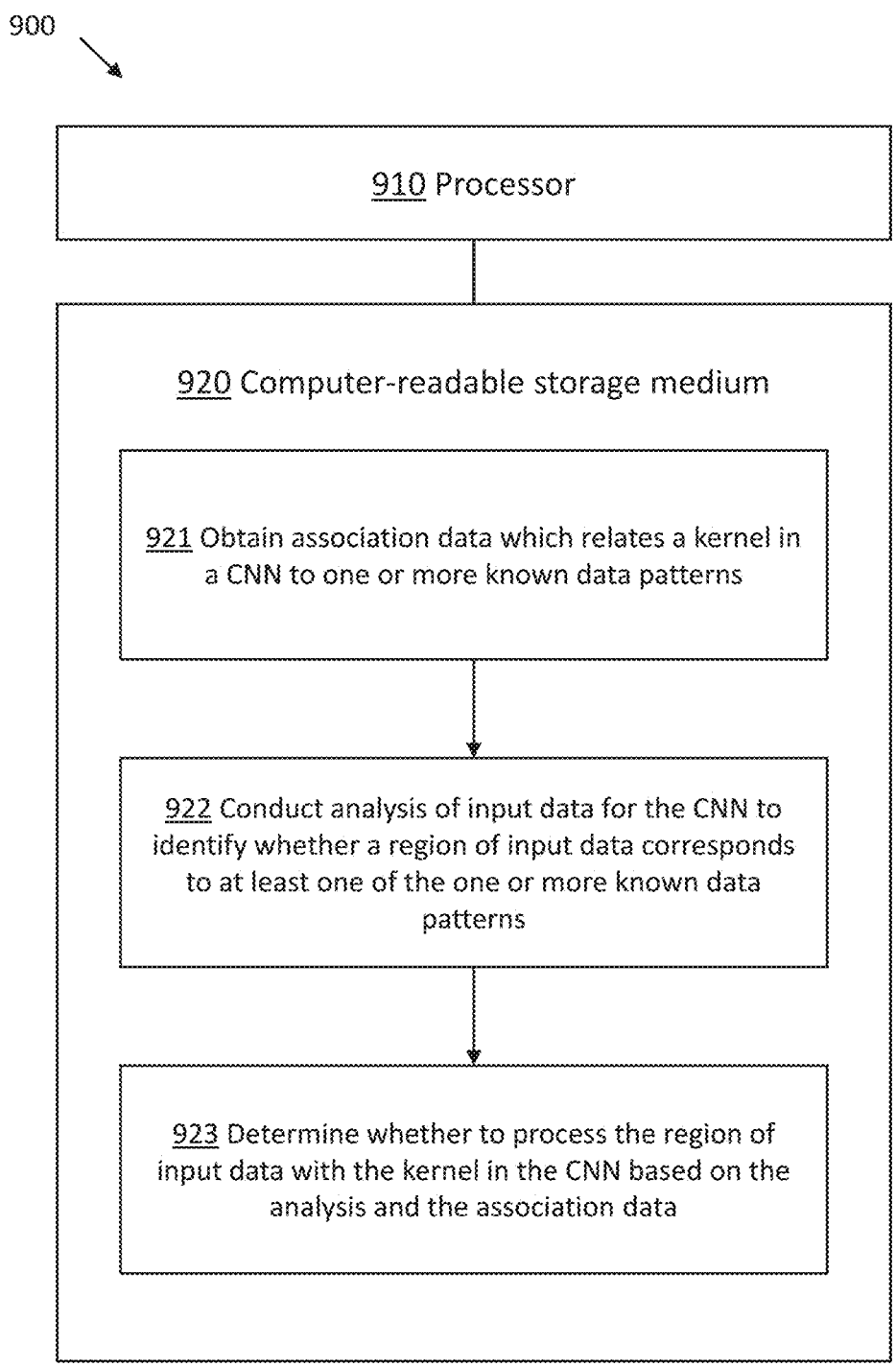
FIG. 9 is a schematic representation of a computer program product.

The CPU 840 of FIG. 9 includes a driver 945 which for example provides an interface between software configured to control or configure the neural network and the neural network accelerator 850, which is configured to perform the processing to implement the neural network. The driver 845 may therefore form part of or correspond to a control system for controlling the operation of the at least one processor.

The computing system 830 of FIG. 8 also includes a dynamic memory controller (DMC) 860 which may be used to control access to storage 870 of the computing system 830. The storage 870 is for example configured to store the image data received from the ISP 820.

The storage 870 is for example external to the neural network accelerator 850 and may be a random access memory (RAM) such as DDR-SDRAM (double data rate synchronous dynamic random access memory). In other examples, the storage 870 may be or include a non-volatile memory such as Read Only Memory (ROM) or a solid state drive (SSD) such as Flash memory. The storage 870 in examples may include further storage devices, for example magnetic, optical or tape media, compact disc (CD), digital versatile disc (DVD) or other data storage media. The storage 870 may be removable or non-removable from the computing system 830. In examples, the neural network 850 may also include local storage, which may nevertheless be considered to form part of the storage of the image processing system 800.

The components of the computing system 830 in the example of FIG. 8 are interconnected using a systems bus 880. This allows data to be transferred between the various components. The bus 880 may be or include any suitable interface or bus. For example, an ARM® Advanced Microcontroller Bus Architecture (AMBA®) interface, such as the Advanced eXtensible Interface (AXI), may be used.

The at least one processor, for example the processor of the ISP 820 or the processor of the neural network accelerator 850, may be configured to obtain association data which relates a kernel in a CNN to one or more known data patterns. The at least one processor may be configured to retrieve the association data from local storage 870.

The at least one processor, for example the processor of the ISP 820 or the processor of the neural network accelerator 850, may be configured to conduct an analysis of input data for the CNN to identify whether a region of input data corresponds to at least one of the one or more known data patterns. The at least one processor may be configured to retrieve the input data and/or the one of the one or more known data patterns from storage 870.

The at least one processor, for example the processor of the ISP 820 or the processor of the neural network accelerator 850, may be configured to identify a known data pattern in which all values in the known data pattern are the same value, all values in the known data pattern are within a pre-determined range of values, all values in the known data pattern are a pre-determined value, or all values in the known data pattern have a pre-determined relationship.

In some examples, the at least one processor, for example the processor of the ISP 820 or the processor of the neural network accelerator 850, may be configured to select a data pattern, from a plurality of data patterns, based on auxiliary information for the input data. The at least one processor may be configured to analyze the auxiliary information for the input data to determine if a region of the input data corresponds to one or more known data patterns. In other examples, the at least one processor, for example the processor of the neural network accelerator 850, may be configured to analyze compression metadata information of the input data to determine a data pattern. The at least one processor may be configured to analyze compression metadata generated from an output feature map (during storing the input data to memory) or an input feature map (during retrieving the input data from memory).

In some examples, the at least one processor, for example the processor of the ISP 820 or the processor of the neural network accelerator 850, may be configured to create compression metadata information of input data on the fly. In further examples, the input data may be an input/output feature map generated by a convolutional layer of the CNN. The at least one processor may be configured to create compression metadata from the output feature map after it is processed by a convolutional layer or from the input feature map before it is processed by a convolutional layer.

The at least one processor may be configured to store auxiliary information for input data, compression metadata information for input data and/or compression metadata information for an input/output feature map in storage 870. Furthermore, the at least one processor may be configured to retrieve said information from storage 870.

The at least one processor, for example the processor of the ISP 820 and/or the processor of the neural network accelerator 850, may be configured to determine whether to process the region of input data with the kernel in the CNN based on the analysis and the association data.

The at least one processor, for example the processor of the ISP 820 and/or the processor of the neural network accelerator 850, may be configured to determine to not process the region of input data with the kernel in the CNN as a result of determining one or more known data patterns being associated with the kernel in the association data and being identified in the analysis.

The at least one processor, for example the processor of the neural network accelerator 850, may be configured to process the region of input data with the kernel in the CNN. Processing the region of input data with the kernel may comprise convolving the region of input data with the kernel to generate a convolved output of the kernel and processing the convolved output of the kernel using an activation function to determine a data-region output of the kernel.

In some examples, the input data may comprise an input layer of the CNN. As such, the kernel, which is related by the association data to one or more known data patterns, and with which the region of the input layer is to be processed, is in the first layer. The at least one processor, for example the processor of the ISP 820, may be configured to obtain subsequent association data relating a subsequent kernel in a subsequent layer of the CNN to one or more known data patterns. Furthermore, the at least one processor, for example the processor of the ISP 820 and/or the processor of the neural network accelerator 850, may be configured to determine whether to process the region of input data with the subsequent kernel in the CNN based on the analysis and the subsequent association data.

In some examples, the at least one processor, for example the processor of the neural network accelerator 850, may be configured to pre-process a data pattern for a subsequent kernel in the CNN to determine a subsequent data-pattern output of the subsequent kernel. The at least one processor may be configured to store the data-pattern output of the subsequent kernel in storage 870. The processor of the neural network accelerator 850 may then be configured to generate subsequent association data. The processor of the ISP 820 and/or the processor of the neural network accelerator 850, may then be configured to determine whether to process the input data for the subsequent kernel in the CNN based on the subsequent data-pattern output of the second kernel. In examples when the input data comprises an output feature map, the processor of the neural network accelerator 850 may be configured to determine whether to process the output feature map for the subsequent kernel in the CNN based on the subsequent data-pattern output of the second kernel.

In other examples, the input data may comprise an input feature map of the CNN. As such, the kernel, which is related by association data to one or more known data patterns, and with which the region of the input feature map is to be processed, is in a subsequent layer.

In other examples, the at least one processor, for example the processor of the ISP 820 or the processor of the neural network accelerator 850, may be configured to determine whether to disable the analysis of the input data for a pre-determined time. Disabling the analysis of the input data by the at least one processor may be based on the frequency of identification of the region of input data that corresponds to the data pattern. If the input data frequently corresponds to the data pattern, the at least one processor may determine to continue to analyze the input data and may thus determine that the input data need not be processed by the kernel of the CNN. As a result, when the input data frequently corresponds to the data pattern, the processing of the input data with the kernel may be frequently eliminated. If the input data frequently does not correspond to the data pattern, the at least one processor may determine to disable the analysis of the input data. As a result, the input data may be processed by the kernel of the CNN.

The at least one processor, for example the processor of the neural network accelerator 850, may be configured to generate the association data by pre-processing one or more known data patterns with the kernel to determine one or more data-pattern outputs of the kernel. The at least one processor may be configured to retrieve the data pattern from storage 870 (which may be system storage, a main memory or local storage accessible to the neural network accelerator 850). The at least one processor may be configured to store the data-pattern output of the kernel in storage 870. In examples in which the neural network accelerator 870 is implemented in hardware, the local storage may be on-chip memory. The local storage may for example be a static random-access memory (SRAM), although other memory types are possible.

The at least one processor, for example the processor of the ISP 820 and/or the processor of the neural network accelerator 850, may be configured to determine whether to process the region of input data with the kernel based on the data-pattern output of the kernel. The at least one processor, for example the processor of the neural network accelerator 850, may be configured to determine to not process the region of input data with the kernel in the convolutional network is based, at least in part, on the one or more data-pattern outputs of the kernel.

In examples where the data-pattern output of the kernel is determined by the processor of the neural network accelerator 850 to be zero or negligible, the processor of the neural network accelerator 850 may determine not to process the region of input data with the kernel in the CNN. Instead, the processor of the neural network accelerator 850 may determine that the data-region output of the kernel is equivalent to the data-pattern output of the kernel. In examples where the data-pattern output of the kernel is determined by the processor of the neural network accelerator 850 to be non-zero or non-negligible, the processor of the neural network accelerator 850 may process the region of input data with the kernel in the CNN.

It is to be appreciated that the image processing system 800 of FIG. 8 is merely an example and other image processing systems may be used in other examples.

FIG. 9 is a schematic representation 900 of a processor 910 and a computer-readable storage medium 920 containing computer-readable instructions 921-924 for processing input data which, when executed by at least one processor 910, cause the at least one processor 910 to perform a procedure according to examples described herein. The computer readable instructions 921-924 may be retrieved from a machine-readable media, for example any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a volatile memory such as a random access memory (RAM), a dynamic random access memory (DRAM), a static random access memory (SRAM) or a fast CPU cache memory, or a non-volatile memory such as a flash memory, a read-only memory (ROM) or an erasable programmable read-only memory (EPROM). Machine-readable media may relate to a primary storage device such as RAM or ROM, or a secondary storage device such as an optical disk, a hard disk drive (HDD), a solid-state drive (SSD) or a solid-state hybrid drive (SSHD).

At block 921, the instructions cause the processor to obtain association data which relates a kernel in a CNN to one or more known data patterns. At block 922, the instructions cause the processor to conduct an analysis of input data for the CNN to identify whether a region of input data corresponds to at least one of the one or more known data patterns. At block 923, the instructions cause the processor to determine whether to process the region of input data with the kernel in the CNN based on the analysis and the association data.

Whilst an embodiment of the methods described herein relate to input data comprising image data, other embodiments are envisaged, for example audio data. An audio track may comprise multiple samples of audio data, whereby each sample contains amplitude information for a range of frequencies at a specific point in time. Audio data therefore may contain amplitude information for a range of frequencies (i.e. a region of audio data). A data pattern may be considered to be an audio pattern, wherein the audio pattern comprises a range of frequencies with the same or similar amplitude information. For example, the values of the amplitude information (for the range of frequencies) may be the same value, a pre-determined value, within a pre-determined range of values and/or have a pre-determined relationship. During an audio track, a certain frequency range may have the same or similar amplitude information. As an illustrative example, if the audio track has been obtained from an audio surveillance microphone, the audio track may contain a background noise for a certain length of time. As a result, a certain frequency range (i.e. a region of audio data) may contain amplitude information representative of the background noise. As such, the frequency range may contain the same (or similar) amplitude information. Processing audio data, for example to perform a feature detection operation such as noise detection or noise recognition, typically requires a significant amount of computation. However, some of this processing may be redundant if frequency ranges of the audio track contain amplitude information that are the same or similar. Application of the method described herein may reduce processing of the data portion comprising, for example, audio data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A computer-implemented method of processing input data, the method comprising:
   obtaining association data which relates a kernel in a convolutional neural network to one or more known data patterns;
   conducting analysis of input data for the convolutional neural network to identify whether a region of input data corresponds to at least one of the one or more known data patterns; and
   determining whether to process the region of input data with the kernel in the convolutional neural network based on the analysis and the association data.

2. A method according to claim 1, comprising determining to not process the region of input data with the kernel in the convolutional neural network as a result of determining one or more known data patterns being associated with the kernel in the association data and being identified in the analysis.

3. A method according to claim 2, wherein determining to not process the region of input data with the kernel of the convolutional neural network comprises determining a value for the data-region output of the kernel.

4. A method according to claim 1, wherein the analysis comprises identifying a known data pattern in which:
   all values in the known data pattern are the same value;
   all values in the known data pattern are within a pre-determined range of values;
   all values in the known data pattern are a pre-determined value; or
   all values in the known data pattern have a pre-determined relationship.

5. A method according to claim 1, wherein the input data comprises image data comprising a first plurality of pixels; and wherein the analysis comprises identifying a known data pattern in which:
   all pixels in a second plurality of pixels are the same value;

all pixels in the second plurality of pixels are within a pre-determined range of values;
all pixels in the second plurality of pixels are a pre-determined value;
all pixels in the second plurality of pixels have a pre-determined relationship;
all pixels in the second plurality of pixels have a pre-defined rate of change;
all pixels in the second plurality of pixels are within a pre-defined range of rates of change;
all pixels in the second plurality of pixels have a pre-defined depth; or
all pixels in the second plurality of pixels are within a pre-defined range of depths.

6. A method according to claim 1, wherein processing the region of input data with the kernel in the convolutional neural network comprises:
convolving the region of input data with the kernel to generate a convolved output of the kernel; and
processing the convolved output of the kernel using an activation function to determine a data-region output of the kernel.

7. A method according to claim 1, wherein one of the one or more known data patterns is selected, from a plurality of pre-determined data patterns, based on auxiliary information of the input data.

8. A method according to claim 1, wherein one of the one or more known data patterns is determined by analyzing compression metadata information of the input data.

9. A method according to claim 8, wherein the compression metadata information of the input data is generated on the fly from the input data during storing the input data to memory or during retrieving the input data from memory.

10. A method according to claim 1, wherein the convolutional neural network comprises an input layer, a first layer and one or more subsequent layers.

11. A method according to claim 10, wherein input data comprises the input layer, and
wherein the kernel, which is related by the association data to one or more known data patterns, and with which the region of the input layer is to be processed, is in the first layer.

12. A method according to claim 11, further comprising obtaining subsequent association data relating a subsequent kernel in a subsequent layer of the convolutional neural network to one or more known data patterns; and
determining whether to process the region of input data with the subsequent kernel in the convolutional neural network based on the analysis and the subsequent association data.

13. A method according to claim 1, wherein input data comprises an input feature map, and
wherein the kernel, which is related by association data to one or more known data patterns, and with which the region of the input feature map is to be processed, is in a subsequent layer.

14. A method according to claim 1, further comprising determining whether to disable conducting the analysis of the input data, for a pre-determined time, based on the frequency of identification of the region of input data that corresponds to at least one of the one or more known data patterns.

15. A method according to claim 14, wherein determining to not process the region of input data with the kernel in the convolutional network is based, at least in part, on the one or more data-pattern outputs of the kernel.

16. A method according to claim 1, further comprising generating the association data by pre-processing one or more known data patterns with the kernel to determine one or more data-pattern outputs of the kernel.

17. A system for processing input data, the system comprising processing circuitry for a convolutional neural network, wherein the processing circuitry is configured to:
obtaining association data which relates a kernel in a convolutional neural network to one or more known data patterns;
conducting analysis of input data for the convolutional neural network to identify whether a region of input data corresponds to at least one of the one or more known data patterns; and
determining whether to process the region of input data with the kernel in the convolutional neural network based on the analysis and the association data.

18. A non-transitory computer readable medium comprising instructions which, when executed by processing circuitry of a computing device, cause the computing device to:
obtain association data which relates a kernel in a convolutional neural network to one or more known data patterns;
conduct analysis of input data for the convolutional neural network to identify whether a region of input data corresponds to at least one of the one or more known data patterns; and
determine whether to process the region of input data with the kernel in the convolutional neural network based on the analysis and the association data.

* * * * *